United States Patent [19]

Rütimann

[11] Patent Number: 4,887,881
[45] Date of Patent: Dec. 19, 1989

[54] PLUGGING APPARATUS FOR THE TRANSMISSION OF ELECTRICAL ENERGY

[75] Inventor: Peter Rütimann, Zug, Switzerland

[73] Assignee: Feller AG, Horgen, Switzerland

[21] Appl. No.: 216,196

[22] Filed: Jul. 7, 1988

[30] Foreign Application Priority Data

Aug. 24, 1987 [CH] Switzerland .................... 3235/87

[51] Int. Cl.$^4$ .................................... G02B 6/36
[52] U.S. Cl. ........................... 350/96.20; 439/378
[58] Field of Search .................. 350/96.20, 96.21; 439/100, 101, 106, 210, 378

[56] References Cited

U.S. PATENT DOCUMENTS 4,767,181 8/1988 McEowen ............... 350/96.20 X

FOREIGN PATENT DOCUMENTS 2106662 4/1983 United Kingdom ............ 350/96.20
2110409 6/1983 United Kingdom ............ 350/96.20

*Primary Examiner*—William L. Sikes
*Assistant Examiner*—Akm E. Ullah
*Attorney, Agent, or Firm*—Laurence R. Brown; Alfred J. Mangels

[57] ABSTRACT

The plugging apparatus, may such be a plug and/or a socket has a plurality of terminals or plug contact sockets. These serve for the transmission of electrical energy and include light wave conductors integrated therein for the transmission of optical information signals via one and the same plugging apparatus.

6 Claims, 1 Drawing Sheet

PLUGGING APPARATUS FOR THE TRANSMISSION OF ELECTRICAL ENERGY

BACKGROUND OF THE INVENTION

1. Field of the Invention

The present invention relates to a plugging apparatus for the transmission of electrical energy at the one hand and of optical information signals at the other hand to a counter part of the plugging apparatus, including a plug having a plurality of terminals and/or a socket having a plurality of plug contact sockets for receipt of terminals of a plug for the transmission of energy, and including at least one light wave conductor for the transmission of information signals.

2. Description of the Prior Art

In the presently generally installation technique, specifically in the domestic and office field every room is as a rule provided with electrical current via sockets in accordance with the standards of a respective country. Apart from this end distribution of electrical energy, information furthermore distributed, too, such as via telephone extensions, local area networks or other information channels among other also light wave conductors. The two channels must be kept separate. In spite thereof they often influence each other because also the information channel is usually fed via metallic conductors and can be subject to interference by the conductor for the electrical energy.

Presently no generally applied standards regarding the other channels for the transmission of information have prevailed, there is rather a diversity of systems governing this art such that the connecting onto an information channel incorporates substantially more trouble than acquiring the supply of the electrical energy.

Typical circumstances which are a drawback and are inconvenient for the user encompass the fact that in modern apparatuses of the office technique and in the recent domestic electronics most of the units must be connected via the power-supply plug as well as via a data plug connection to the installation technique of the building. A compatibility (within the borders of the respective countries) is present only with regard to the supply of electrical current at which every apparatus plug fits into practically every socket of the building and meets all demand specifications (voltage, frequency, maximal power demand).

SUMMARY OF THE INVENTION

It is, therefore, a general object of the present invention to provide a plugging apparatus which permits the transmission of electrical energy as well as the passing on and receiving of optical information signals in a simple way.

A further object of the present invention is to provide a lugging apparatus in which each light wave conductor is also located in the plug and extends through a respective terminal at the forward end thereof.

A further object is to provide a plugging apparatus in which in case of a socket each light wave conductor is also correspondingly located in the socket and extends to the base of a correspondingly allocated plug contact socket.

Still a further object is to provide a plugging apparatus in which each light wave conductor is led coaxially through the corresponding terminal.

A further object is to provide a plugging apparatus in which the light wave conductor is made of a plastics material or glass fibre.

Yet a further object is to provide a plugging apparatus in which every plug or every socket comprises a light wave conductor for the outgoing leg and a further light wave conductor for the return leg of the information signal transmission. Alternatively one single light wave conductor may be provided for the transmission of information signals in the one or the other direction.

Each aforesaid plugging apparatus has application on its own (for performing the basic function), a technical use can be, however, realized only if a respective plugging apparatus as well as its counterpart are designed in accordance with the invention.

For this practical application it is a further object to provide a means for securing a selfcentering contact between the contact surfaces of the light wave conductors of the one part of the apparatus and the contact surfaces of the light wave conductors of the counter part thereof.

Still a further object is to provide a plugging apparatus comprising means for an automatic longitudinal positioning of the terminals whereby an as precise as possible coupling of light wave conductors located opposite of each other in the two apparatus parts is guaranteed.

A further object is to provide a plugging apparatus comprising a coupling aid made of a flexible material and having a low light subduing characteristic provided between each respective two opposite light wave conductors.

BRIEF DESCRIPTION OF THE DRAWINGS

The present invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
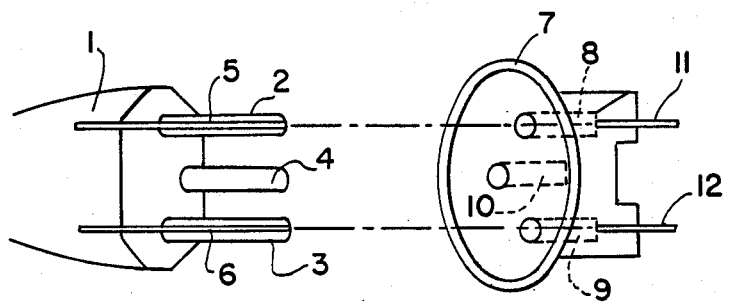
FIG. 1 illustrates on a schematic basis only a plug and a socket, both structured in accordance with the invention.

The plug illustrated in FIG. 1 schematically is provided with three terminals 2, 3 and 4 and forms therewith a basically standard power-supply plug which serves for transmitting of electrical energy (for instance from a socket such as a wall socket) via the electrically conductive terminals 2, 3 and 4. Deviating now from common plugs light wave conductors 5 and 6, respectively of plastic material or glass fibre, i.e. of an electrically insulating material are embedded in the terminals 2 and 3. These light wave conductors 5, 6 extend from a corresponding cable from the rear into the terminals 2, 3 which are designed hollow, i.e. with an axial recess, and through these terminals up to their ends where they form free and preferably polished contact surfaces for a possible oppositely located contact surface of a different light wave conductor.

The socket 7 illustrated in FIG. 1 is designed accordingly: it comprises three electrically conducting plug contact sockets 8, 9 and 10, respectively in which the electrically conducting terminals of a counterplug can be received according to the well known procedure.

At two of the plug contact sockets 8 and 9, respectively two light wave conductors 11, 12, too extend from the base of the socket through the body of the socket and can be led further in form of a cable. Also here the ends of the light wave conductors form at the base of the socket free, preferably polished contact surfaces for corresponding counter-conductors. The plug contact members 7-9 are connectable to the main conductor as commonly done.

Figure 2:
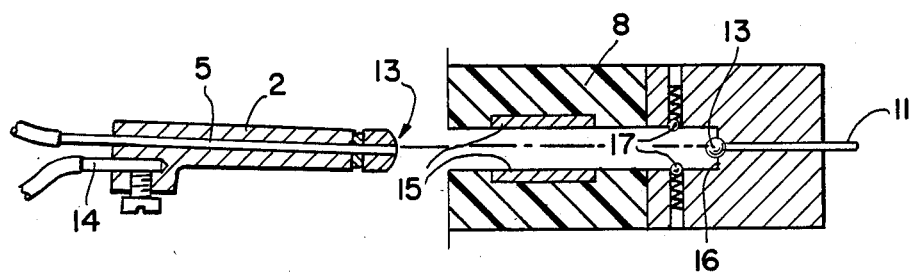
FIG. 2 illustrates also schematically only a contact terminal prong and a plug contact socket of plugging apparatus structured in accordance with the invention.

FIG. 2 of the drawing illustrates some details of plugging apparatus according to FIG. 1. A terminal 2 is shown at the left side which is hollow along its complete longitudinal extent through which a light wave conductor 5 of a plastics material or glass fibre is coaxially led, whereby a preferably polished contact surface 13 of the light wave conductor 5 is present at the forward end. The connection proper for the transmitting of electrical energy is conducted off via the wire 14.

A plug contact socket 8 is illustrated at the right side of FIG. 2 which is provided with e.g. contact springs 15 for the transmission of electrical energy (leads to the network conductor). At the base 16 of the socket 8 a light wave conductor 11 preferably has a polished contact surface ends.

Due to the forward part of the socket 8 being equipped with contact springs 15 a self centering of a terminal 2 inserted therein in the rear part of the socket is possible. It is namely important that two light conductors which are to be coupled must be positioned as close as possible and centered to each other. For this reason auxiliary means may be provided for a safe longitudinal positioning of a terminal (e.g. spring loaded locking balls 17, which urge the terminal against the bottom of the bush or at least lock it in its end position).

Should such be necessary for optimizing reasons, i.e. in order to keep possible light coupling losses at a minimum it is possible to interpose a coupling aid or auxiliary means 18 of a flexible material having low light subduing properties between the optical contact surfaces of two abutting light conductors.

By means of the inventive design it has now been made possible to integrate without detrimentally influencing the transmission of electrical energy in one and the same plugging apparatus also light wave conductors for the transmitting of optical signals.

Because the transmitting medium is fundamentally different (a conductor for the electrical transmission, an insulator for the optical transmission) it has been proven that no mutual influencing or interference, respectively occurs.

Of large benefit for the user are the circumstances that specifically apparatus for the processing of information can now be connected by means of one single plugging apparatus in all its functions to the installation of the buildings. This allows considerable savings in installation.

While there are shown and described present preferred embodiments of the invention, it is to be distinctly understood that the invention is not limited thereto, but may be otherwise variously embodied and practiced within the scope of the following claims.

I claim:

1. Plugging apparatus for transmission of both electrical energy and of optical information signals, comprising in combination, plug and socket members, each including a plurality of terminals for transmission of electrical energy and two light wave conductors for transmission of optical information signals, means locating each light wave conductor in said plug to extend therethrough to a terminal end for mating with said socket and wherein said light wave conductors are located in two of said terminals for transmission of electrical energy for respectively constituting outgoing and incoming information transmission conduits.

2. Plugging apparatus for transmission of both electrical energy and of optical information signals, comprising in combination, plug and socket members, each including a plurality of terminals for transmission of electrical energy and two light wave conductors for transmission of optical information signals, means locating each light wave conductor in said plug to extend therethrough to a terminal end for mating with said socket and means for securing a self centering light transmission contact between light wave conductors in said plug and socket respectively.

3. Plugging apparatus for transmission of both electrical energy and of optical information signals, comprising in combination, plug and socket members, each including a plurality of terminals for transmission of electrical energy and two light wave conductors for transmission of optical information signals, means locating each light wave conductor in said plug to extend therethrough to a terminal end for mating with said socket and coupling means comprising a flexible material having low light subduing characteristics positioned to couple respective light wave conductors in said plug and socket.

4. Plugging apparatus for transmission of both electrical energy and of optical information signals between a plug and socket, comprising in combination, a plurality of plug contact sockets in said socket for mating receipt of corresponding terminals in said plug for the transmission of electrical energy, and two light wave conductors located in the plug and in the socket for transmission of optical information signals extending respectively through the plug and socket for transmitting incoming and outgoing information signals.

5. Plugging apparatus for transmission of both electrical energy and of optical information signals between a plug and socket, comprising in combination, a plurality of plug contact sockets in said socket for mating receipt of corresponding terminals in said plug for the transmission of electrical energy, and two light wave conductors located in the plug and in the socket for transmission of optical information signals and means for securing a self centering contact between respective contact surfaces of the plug and socket for the light wave conductors.

6. Plugging apparatus for transmission of both electrical energy and of optical information signals between a plug and socket, comprising in combination, a plurality of plug contact sockets in said socket for mating receipt of corresponding terminals in said plug for the transmission of electrical energy, and two light wave conductors located in the plug and in the socket for transmission of optical information signals and coupling means comprising a coupling aid made of a flexible material having a low light subduing characteristic positioned between the respective light wave conductors of the plug and socket.

* * * * *